(12) United States Patent
Boswell

(10) Patent No.: US 7,890,499 B1
(45) Date of Patent: Feb. 15, 2011

(54) PRESENTATION OF SEARCH RESULTS WITH COMMON SUBJECT MATTERS

(75) Inventor: Dustin Boswell, Agoura Hills, CA (US)

(73) Assignee: Google Inc., Mountain View, CA (US)

( * ) Notice: Subject to any disclaimer, the term of this patent is extended or adjusted under 35 U.S.C. 154(b) by 93 days.

(21) Appl. No.: 11/566,083

(22) Filed: Dec. 1, 2006

Related U.S. Application Data

(63) Continuation of application No. 11/460,928, filed on Jul. 28, 2006, now abandoned.

(51) Int. Cl.
*G06F 7/00* (2006.01)

(52) U.S. Cl. ....................... 707/722; 707/726

(58) Field of Classification Search .................. 707/3, 707/5, 10, 104.1, 722, 726
See application file for complete search history.

(56) References Cited

U.S. PATENT DOCUMENTS

| | | | | |
|---|---|---|---|---|
| 6,366,923 B1* | 4/2002 | Lenk et al. | .................. | 707/706 |
| 6,499,029 B1* | 12/2002 | Kurapati et al. | ............. | 707/750 |
| 6,675,159 B1* | 1/2004 | Lin et al. | ....................... | 707/1 |
| 2002/0083039 A1 | 6/2002 | Ferrari et al. | | |
| 2002/0124004 A1* | 9/2002 | Reed et al. | .................. | 707/100 |
| 2004/0030692 A1* | 2/2004 | Leitermann | ..................... | 707/4 |
| 2004/0093321 A1 | 5/2004 | Roustant et al. | | |
| 2004/0143569 A1* | 7/2004 | Gross et al. | ..................... | 707/3 |
| 2004/0143573 A1* | 7/2004 | Burkey et al. | ................... | 707/3 |
| 2004/0143659 A1 | 7/2004 | Milliken et al. | | |
| 2007/0100862 A1 | 5/2007 | Reddy et al. | | |
| 2007/0168331 A1 | 7/2007 | Reddy et al. | | |

OTHER PUBLICATIONS

AIIM E-DOC Magazine—Enterprise Content Management at Work!, "Going Native, When Should You Use a Native XML Database?" [online] Nov./Dec. 2002 [Retrieved on Oct. 3, 2005] Retrieved from the Internet: <URL: http://www.edocmagazine.com/columns_articles.asp?ID=25421&vault=CFOCUS &Header=e_all_columns_header.gif>.

Ebay, "How Can I find What I Want to Buy?" [online] 2005 [Retrieved on Oct. 3, 2005] Retrieved from the Internet: <URL: http://pages.ebay.com/help/find/questions/find-items.html>.

(Continued)

*Primary Examiner*—Mohammad Ali
*Assistant Examiner*—John P Hocker
(74) *Attorney, Agent, or Firm*—Fish & Richardson P.C.

(57) ABSTRACT

Methods, systems, and computer program products feature determining a plurality of search result items responsive to a search query. A plurality of search modes are identified based on the query or the plurality of search result items or both. Each search mode is associated with a respective collection of records. The plurality of search result items are provided to a user with an indication of each search mode in the plurality of search modes. User input selecting a first search mode is received, where the first search mode is one of the plurality of search modes. One or more mode-specific search result items are determined based on the search query, where each mode-specific search result item is from the collection of records that is associated with the first search mode. The one or more mode-specific search result items are provided to the user.

34 Claims, 7 Drawing Sheets

OTHER PUBLICATIONS

Ebay, "Keyword Search Category Expansions" [online] 2005 [Retrieved on Oct. 3, 2005] Retrieved from the Internet: <URL: http://pages.ebay.com/help/find/search-expansions.html>.

IXIASOFT, Inc. "TEXTML Server for Technical Documentation", 9 Pages.

IXIASOFT, Inc. "XML Database, XML Search Engine, XML Content Management—IXIASOFT", [online] [Retrieved on Oct. 3, 2005] Retrieved from the Internet: <URL: http://www.ixiasoft.com>.

Office Action from U.S. Appl. No. 11/460,928 dated Jun. 26, 2008 (18 pages).

"Program of the Sym, Symposium Proceedings", Humboldt-Universität [online] 2005 [Retrieved on Oct. 3, 2005] Retrieved from the Internet: <URL: http://www.lirmm.fr/~bella/XSym/program.htm>.

"Welcome to Flickr—Photo Sharing" [online] 2005 [Retrieved on Oct. 3, 2005] Retrieved from the Internet: <URL: http://www.flickr.com>.

Yahoo!, "Yahoo! Search, My Web 2.0 Beta" [online] 2005 [Retrieved on Oct. 3, 2005] Retrieved from the Internet: <URL: http://myweb2.search.yahoo.com/>.

"Epicurious.com Website" (printed 2006), available at http://www.epicurious.com.

"Google Froogle Website" (printed 2006), available at http://froogle.google.com/froogle?q=hat&btnG=Search+Froogle.

"Google Images Website" (printed 2006), available at http://images.google.com/images?q=dog&hl=en&btnG=Search+Images.

"Google Scholar Website" (printed 2006), available at http://scholar.google.com/scholar?q=tcp%2Fip&hl=en&lr=&btnG=Search.

"Google Website" (printed 2006), available at http://www.google.com/search?hl=en&q=russian+book&btnG=Google+Search.

"Monster.com Website" (printed 2006), available at http://www.monster.com.

"Realtor.com Website" (printed 2006), available at http://www.realtor.com/Default.asp?poe=realtor.

"Yahoo Website" (printed 2006), available at http://search.yahoo.com/search?p=nursing+jobs&fr=yfp-t-500&toggle=1&cop=&ei=UTF-8.

\* cited by examiner

PRESENTATION OF SEARCH RESULTS WITH COMMON SUBJECT MATTERS

RELATED APPLICATIONS

This application is a continuation of U.S. patent application Ser. No. 11/460,928, titled "Unified Search Interface," filed Jul. 28, 2006.

BACKGROUND

This specification relates generally to information systems, and more particularly to interactive searching.

Users seeking to find information among an abundance of data can turn to an information retrieval system that can search for the sought after information. A search engine is an example of an information retrieval system that can be used to find information on the World Wide Web. To find information, users can specify search criteria (a "query") to a user interface provided by the search engine.

Typical general-purpose search engines provide a user interface that allows search queries to be specified as simple strings of text. A query is typically answered with an overwhelming number of search result items. Search result items can refer to a wide variety of content, pertain to various subjects, and may or may not reflect the sort of information that a user is actually seeking. For example, a user seeking a recipe for Cajun jambalaya may provide the query "Cajun" and receive search results concerning Cajun cuisine, Acadian history, and performance art in Louisiana. Finding precise information from among the search results can be difficult. To refine the search results, users are normally required to revise their search criteria. Typically, users' lack of knowledge prevents them from providing the precise terminology needed to accurately articulate the specific search results that they desire.

Search engines that pertain to particular subject matter may provide a user interface that allows users to provide subject-specific search criteria that are germane to the search engine's subject matter. Ideally, the user interface of the search engine provides some guidance for users by providing subject-specific search options that users might otherwise be unaware of. For example, a real-estate searching facility might allow specification of criteria such as geographical location, minimum and maximum price, and whether or not the property has a swimming pool. For users, switching between various subject-specific search engines can be inconvenient and awkward. Subject-specific search engines typically do not provide users with a comprehensive overview that encompasses more than one subject.

SUMMARY

In general, one aspect of the subject matter described in this specification can be embodied in a method that includes determining a plurality of search result items responsive to a search query. A plurality of search modes are identified based on the query or the plurality of search result items or both. Each search mode is associated with a respective collection of records. The plurality of search result items are provided to a user with an indication of each search mode in the plurality of search modes. User input selecting a first search mode is received, where the first search mode is one of the plurality of search modes. One or more mode-specific search result items are determined based on the search query, where each mode-specific search result item is from the collection of records that is associated with the first search mode. The one or more mode-specific search result items are provided to the user. Other embodiments of this aspect include corresponding systems, apparatus and computer program products.

These and other embodiments can optionally include one or more of the following features. Providing the user the one or more mode-specific search result items can include providing an indication of each search mode in the plurality of search modes with the one or more mode-specific search result items. The method can include receiving user input selecting a second search mode, where the second search mode is one of the plurality of search modes and different from the first search mode; determining a second one or more mode-specific search result items based on the search query and from the collection of records that is associated with the second search mode; and providing to the user the second one or more mode-specific search result items and an indication of each search mode in the plurality of search modes. The method can include receiving user input de-selecting the first search mode; and providing to the user the plurality of search result items. A search mode can be a mode of operation that includes presenting mode-specific user interface elements and presenting mode-specific search result items satisfying the search query, where the mode-specific search result items refer to records from a collection of records associated with the search mode. Each search result item in the plurality of search result items can refer to either a record in a collection of records or a document in a corpus of documents. The method can include providing to the user the one or more mode-specific search result items in a format based on a presentation template associated with the first search mode. Records associated with a particular search mode can contain information that pertains to a particular subject matter. All the records associated to the first search mode are stored in a database. All records in the collection of records have a common attribute structure. The method can include, in response to receiving a mode-specific criterion, presenting mode-specific search result items referring to records that have attributes satisfying the mode-specific criterion. The method can include, in response to receiving user input, sorting the one or more mode-specific search result items based on the user input selecting one or more attributes. The method can include, in response to receiving user input, formatting the one or more mode-specific search result items based on the user input selecting presentation templates. The method can include, in response to receiving user input, grouping the one or more mode-specific search result items by one or more attributes, the one or more attributes selected by the user input.

In general, another aspect of the subject matter described in this specification can be embodied in a method that includes, in response to receiving a first search query, determining a plurality of search result items responsive to the first search query. A plurality of search modes are identified based on the first search query or the plurality of search result items or both. A first user interface is provided that is configured to: 1) present the plurality of search result items, 2) present the plurality of search modes, and 3) receive user input selecting a first search mode, where the first search mode is one of the plurality of search modes. In response to receiving user input selecting the first search mode, a second user interface is provided that is configured to present the plurality of search modes and present a plurality of mode-specific search result items satisfying the first search query. Other embodiments of this aspect include corresponding systems, apparatus and computer program products.

These and other embodiments can optionally include one or more of the following features. The mode-specific search result items can refer to records from a collection of records associated with the first search mode. The method can include configuring the second user interface to present one or more user interface elements associated with the first search mode. The method can include receiving user input selecting a second search mode, where the second search mode is one of the plurality of search modes, and where the second search mode is different from the first search mode; and in response, providing a user interface that is configured to present the plurality of search modes and present a plurality of mode-specific search result items satisfying the second search mode. The method can include configuring the second user interface to receive de-selection of the first search mode; receiving user input de-selecting the first search mode; and providing a user interface configured to present search result items satisfying the first search query, where the search result items satisfy no particular search mode. The method can include configuring the second user interface to receive a second search query; receiving the second search query; and providing a user interface configured to present search result items satisfying the second search query, the search result items satisfying no particular search mode. The method can include configuring the second user interface to receive a second search query; receiving the second search query; and providing a user interface configured to present mode-specific search result items satisfying the second search query and associated with the first search mode.

In general, another aspect of the subject matter described in this specification can be embodied in a method that includes receiving a search query. A plurality of first search result items are determined based on the search query, where at least one of the plurality of first search result items refer to a record. The record is associated with a document in a corpus of documents, and each document in the corpus has a rank. Each search result item in the plurality of first search result items is ordered based on the rank of the document referred to by the search result item or the rank of the document associated to the record referred to by the search result item. The ordered plurality of first search result items is provided. Other embodiments of this aspect include corresponding systems, apparatus and computer program products.

These and other embodiments can optionally include one or more of the following features. Where documents in the corpus can be documents accessible on the World Wide Web. The method can include identifying a search mode from a plurality of search modes based on the search query or the plurality of first search result items or both; and providing the identified search mode. Each record can be in a collection of records and each collection of records is associated with a search mode. All records in each collection of records can have a common attribute structure. The method can include receiving user input selecting a search mode; determining a plurality of second search result items referring to records from the collection of records associated with the selected search mode; and providing the plurality of second search result items. The plurality of second search result items can be sorted, constrained or grouped based on the one or more common attributes of each record.

Particular embodiments of the invention can be implemented to realize one or more of the following advantages. A search engine user interface that provides user-selectable search modes allows users to conduct mode-specific searching on a general purpose search engine. Search modes, which correspond to specific subjects, are automatically suggested to the user based on the search query provided, without requiring the user to know and select the appropriate search mode before providing the search query. Providing mode-specific user interface elements in the search engine user interface allows users to constrain and affect the presentation (e.g., layout, sorting, grouping) of search results relevant to a selected search mode. Mode-specific presentation templates can format and present results to emphasize particular aspects of the results. A consistent user interface having a unified look-and-feel that allows users to switch between search modes can be used to deliver both subject-specific searching in combination with general purpose searching Relevant results can be identified by users more quickly and without users having to directly edit the original search query.

The details of one or more embodiments of the invention are set forth in the accompanying drawings and the description below. Other features, aspects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
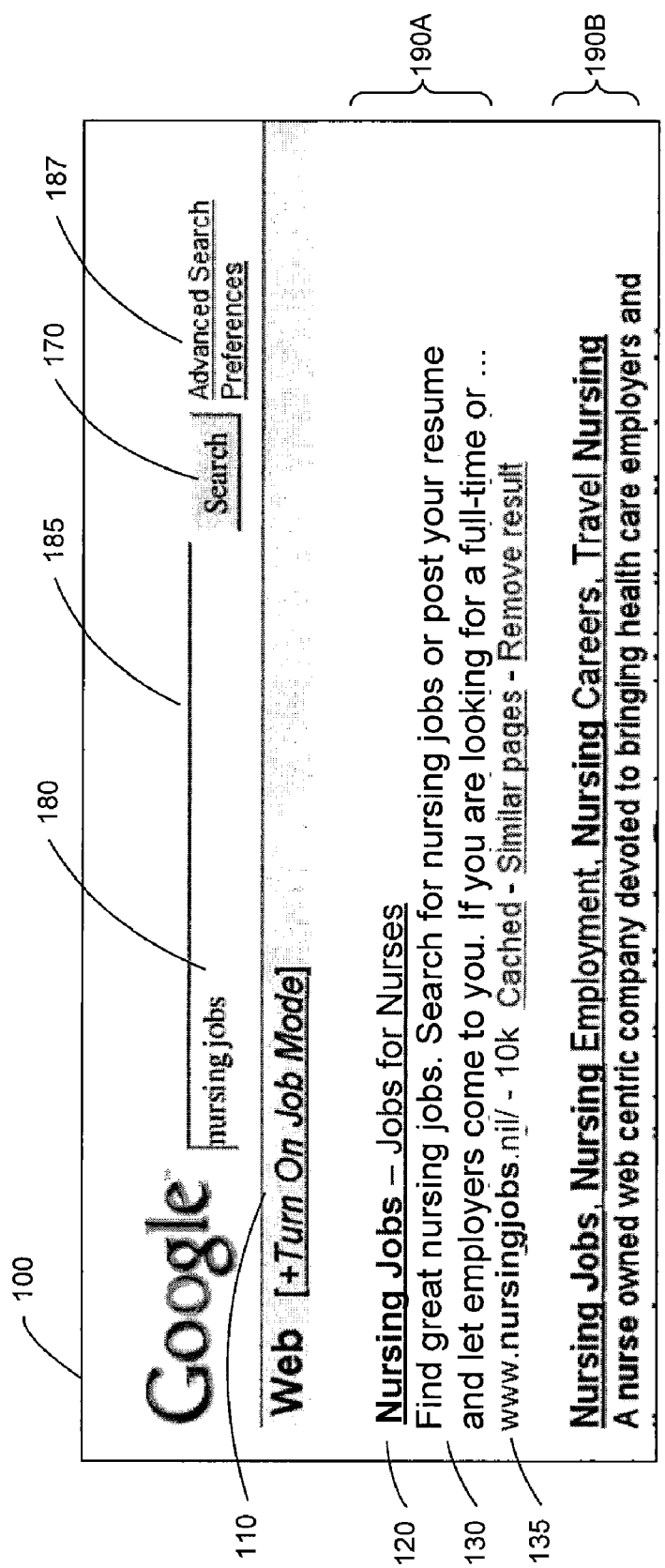
FIG. 1 illustrates an example search engine user interface.

FIG. 1 illustrates an example search engine user interface 100. The user interface 100, provided by a search engine in response to the query "nursing jobs", can be presented by a client such as a web browser. Generally, a client is an instance of a computer program that is capable of presenting a search engine user interface provided by the search engine. The client is also capable of accepting user interaction from the user and providing it to the search engine. A client can be instantiated on various mobile and tethered computing devices, for example personal computers, workstations, mobile computers, laptop computers, electronic games, media players (e.g., Apple iPod), mobile phones, combinations of these, and other suitable computing devices. A client can be implemented in software, firmware, hardware or combinations of these. The client and the search engine can be instantiated on the same computing device or on separate computing devices connected by one or more networks (e.g., the Internet) or other suitable means.

The user interface 100 can be provided by the server as an encoded document such as a Hypertext Markup Language (HTML) encoded document. In general, the user interface can be encoded in a document using an alternative encoding, a combination of encodings or a combination of different documents and encodings. For example, the HTML document can also contain client instructions encoded as JavaScript, which can be used to affect the user interface in response to user input. The user interface is configured by the search engine. By configuring the user interface the search engine specifies what user interface elements are included in the encoded user interface.

The user interface 100 contains user interface elements such as a text box 185, in which a search query can be specified, and a button 170 which can be used to submit the search query. In general, user interface elements are capable of receiving input from users that allows users to use functionality associated with the user interface element. For example, the submit button can receive input (e.g., from a computer mouse or other input device), and in response the search query "nursing jobs" 180 from the text box 185 is submitted to the search engine. The user interface 100 can be configured to include user interface elements such as the "Advanced Search" link 187, which can provide the user with a completely different user interface.

In response to the query, search result items 190 are presented. Each search result item 190A and 190B refers to a document from a corpus of documents. A corpus of documents is a collection of documents that each generally contain textual information. The content of each document can be structured (e.g., a word processor file, text file or a file whose contents are specified in HTML), however the content of all documents in the corpus has no common, predetermined structure. In some implementations, the corpus of documents can be the documents and files found on the World Wide Web.

Information regarding each search result item can be presented, including the document's title 120, location 135 and a summary or sample of the document's content 130, for example. Search result items can be ordered according to the rank of documents in the corpus. The rank of a document ideally indicates how interesting, important, authoritative or accurate the document is relative to other documents in the corpus.

In addition to the search result items, the user interface 100 includes a search mode selector 110. In general, the search mode selector can be a button, link, hotspot, a selectable item on a menu, or an identifiable gesture or utterance (e.g., applicable to voice recognition systems). A search mode selector 110 provides an indication to the user that search modes have been identified by the search engine. Search modes can be identified based on the search query 180, search result items or both. User selection of a search mode selector causes selection of a search mode. A search mode generally refers to a particular subject or topic that can be of interest to the user (e.g., jobs, recipes or restaurants). In this example, the search engine provides the 'job' search mode selector 110 in response to the query 180. In other implementations, search modes are identified from the query, the search result items, or both.

User selection of the search mode selector 110 causes presentation of mode-specific search results.

Figure 2:
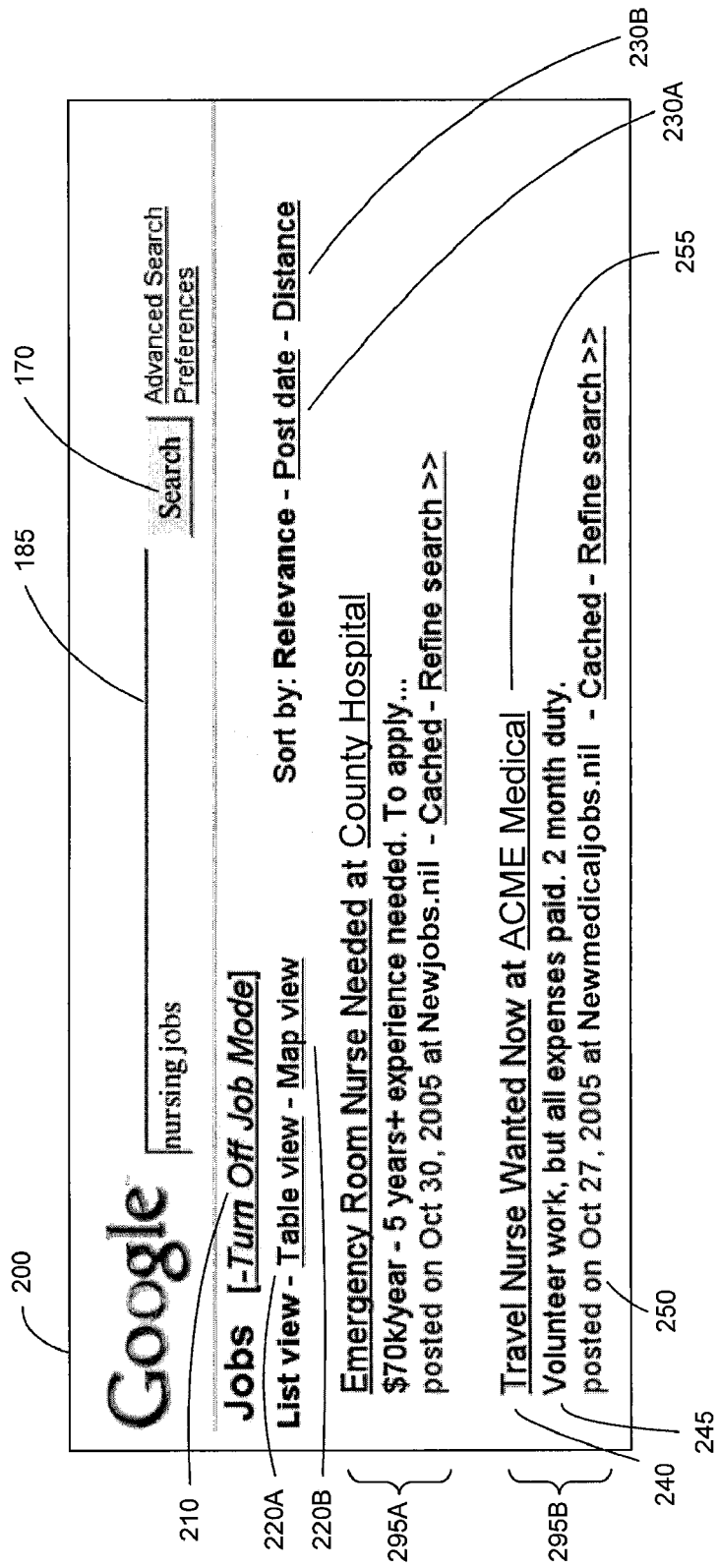
FIG. 2 illustrates a user interface with mode-specific search result items.

FIG. 2 illustrates a user interface 200 with mode-specific search result items. The user interface 200 can be provided in response to the user selecting a search mode (e.g., selecting the 'job' search mode selector 110 in FIG. 1). The user interface 200 includes aspects of the previous user interface (e.g., interface 100), including a textbox 185 and submit button 170 for providing a new search query to the search engine. In addition, the user interface 200 also includes mode-specific search result items 295 and mode-specific user interface elements (e.g., 220 and 230).

Each search result item 295 refers to mode-specific records that are in a collection of records associated to the selected search mode. All the records in a particular collection of records mode have a common attribute structure that includes one or more data elements or attributes. Generally, each attribute contains information that pertains to the particular search mode (e.g., subject matter). For example, one attribute of a job record can be the job's salary. In some implementations, records can be associated with more than one search mode. For example, a record can be associated with a hierarchy of search modes (e.g., a record that is associated with both the job mode and the nursing job mode). A record that is associated with more than one mode includes the attributes of all the modes it is associated with. For example, if 'specialty' is an attribute of nursing job records, then a nursing job record has both the 'salary' and 'specialty' attributes.

Records can be stored as structured information in a file or in memory, or alternatively in one or more tables in a database management system (DBMS). One or more databases or database systems can contain any or all of the records associated with any or all search modes.

Records can be derived from one or more other records (e.g., by composing records from multiple tables). In some implementations, records are derived by processing (e.g., parsing) unstructured documents (e.g., web pages, XML data, media files). The derivation of records can occur at regular intervals (e.g., batch) or as required (e.g., on the fly, just-in-time).

In some implementations, a record can be associated with documents in the corpus. The association can be pre-determined, or can be automatically determined based on the source of the information contained in the record. For example, if a record is derived from processing a document in the corpus, the record can be associated to that particular document. If a record is associated with a document in the corpus, then the record can be ranked based on the rank of the associated document. For example, if a record is derived from a highly ranked document, then the record itself will be highly ranked as well.

The user interface 200 includes search result items 295 that present information from some of the mode-specific attributes of each record referred to by each search result item. All or part of any of the attributes associated with a record can be presented. For example, each job result includes a job offer title 240, an offering agency 255, an excerpt of a description of the position 245 and a date when the job was posted 250.

Mode-specific user interface elements (e.g., 220 and 230) allow users to affect how the mode-specific search result items are presented. For example, users can choose to have search result items presented in a table view or on a map by selecting 'Table view' 220A or 'Map view' 220B, respectively. A table view, for example, displays results in table form, where each row refers to a result and each column refers to one attribute of each search result item. In a map view, search result items are presented as points on a map (e.g., according to the job location attribute of each search result item).

Mode-specific user interface elements can also allow the user to have the mode-specific search result items presented in a particular sorted order. Generally, the user interface can allow the user to sort result items according to their mode-specific attributes. For example, job search result items can be sorted according to when each job was posted 230A or the geographical distance 230B of each job's location from a pre-defined point.

Selecting a search mode essentially selects a mode of operation that can affect subsequent user interaction until another search mode is selected or the selected search mode is deselected or turned off. The mode of operation is characterized by the search result items that, in addition to satisfying the specified search query, refer to records associated with the selected search mode. When a search mode is selected, the mode-specific search result items which refer to the selected search mode can be said to satisfy the search mode. In addition to any mode-specific user interface elements, while a search mode is selected, search mode selectors 210 are presented to allow users to select a new search mode or de-select the selected search mode (e.g., selector 210). In response to de-selecting the selected search mode, non-mode-specific search result items are presented (as in FIG. 1) without mode specific user interface elements, and, if no search modes are identified from the search query, without search mode selectors.

Figure 3:
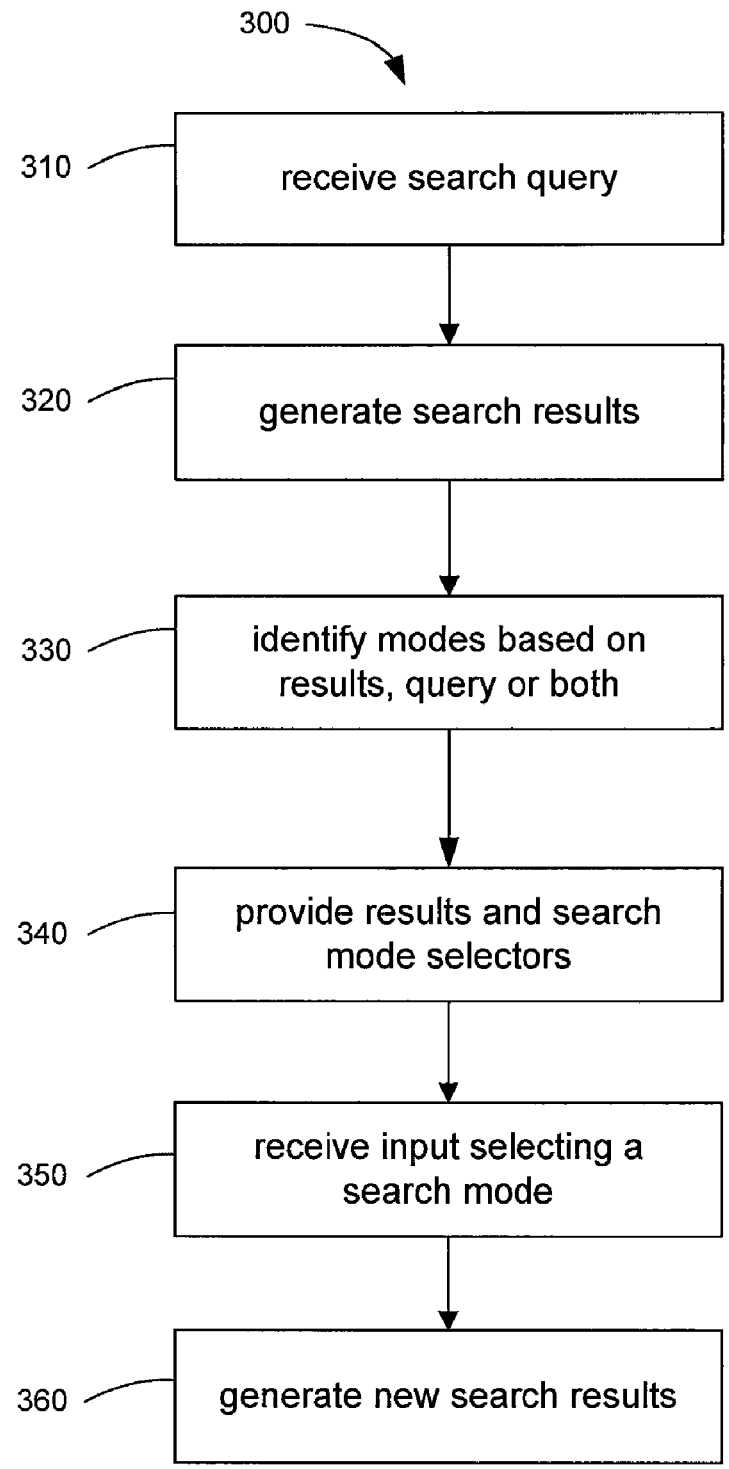
FIG. 3 is a flow diagram of a method for generating mode-specific search result items.

FIG. 3 is a flow diagram of a method 300 for generating mode-specific search result items, which is performed generally by a search engine. Mode-specific search results are generated in response to selection of one or more identified search modes. A search query is received from the user (step 310). The search query characterizes information that the user is seeking. The search query is generally specified by a user and received from the client, but the search query can be determined automatically based on other information (e.g., the content of a document currently being displayed, the geographical coordinates from a global positioning system or identifications made by a voice and image recognition systems). Search result items are generated (step 320) that each refer to either a document in the corpus or a record. Each search result item can include one or more of a title (e.g., name), location (e.g., location of the document or record), a summary of information contained in the document or record.

Search result items that refer to records can be associated to any search mode. For example, assuming that restaurants, recipes and jobs are each defined search modes, then a search for "cajun" can produce search result items, each of which refer to documents from the corpus or to mode-specific records that each pertain to any one of the restaurant, recipe or job search modes.

Search result items pertaining to a particular search mode can include the mode-specific attributes from the record each search result item refers to. For example, recipe search result items (i.e., the recipe records that each search result item refers to) can include a "diet-type" attribute which can be one of "vegan", "vegetarian", "low-fat"; and another attribute called "calories" that can contain the number of calories that a serving of the recipe contains.

One or more search modes are identified (step 330). The search mode is identified based on the search query, the search result items or both.

Search modes can be identified based on the search query. In some implementations, search modes can be identified according to pre-defined keywords associated with each search mode. For example, if the words "recipe" and "cooking" are keywords associated with a recipe search mode, then the recipe search mode will be identified for any query that includes either of these words. Search modes can also be identified using pre-defined heuristic rules. For example, a heuristic rule can require that a particular combination of keywords found among either the query or the search result set identifies a particular search mode. Statistical probabilities can be used to identify search modes (e.g., Bayesian models, based on the prevalence of words among mode-specific records). In some implementations, the user's history of search queries and search mode selections can also be used to identify search modes.

Search modes can also be identified based the search result items generated in response to the search query. In some implementations, search modes can be identified from a document referred by a search result item if the document contains highly relevant keywords corresponding to the particular search mode. For example, if a document contains 'recipe' in its title, individual food ingredients and an accompanying text block (e.g., instructions) the document can be associated to the recipe search mode. Search modes can be identified from the search mode associated to a record referred to by one or more of the search result items. For example, if among search result items there are search result items that refer to records associated with the job and recipe modes, then the job and recipe modes are both identified. In some implementations, the particular search modes identified from the search result items depend on each search result item's rank (e.g., relevance, authority, popularity) as determined by the search engine, for example, and the prevalence of search modes among the result items. Heuristic rules, such as a threshold, can be applied to search mode identification. For example, if 20% of result items for a particular query are associated with recipes, 18% to restaurants and 5% to jobs, then the recipes and restaurants search modes can be identified—assuming a minimum qualifying threshold of 15%.

Search modes can also be identified based on both the search query and the search result items generated in response to the search query. The search modes identified from the search query and search result items alone can be combined. For example, consider when the search query "cajun" is associated with two search modes: recipes and restaurants; and when two result items pertain to the restaurants and five other result items to recipes. In this example, both search modes, restaurant and recipe, can be identified because both search modes are applicable. Alternatively, the recipe search mode is identified because the recipe search mode applies to more search result items. In another implementation, the restaurant search mode is identified if the restaurant search result items are more relevant than other search result items.

A user interface that includes the search result items and is configured to allow for the selection of the one or more identified search modes is provided to the user (step 340). The user interface can be configured to allow selection of search modes by including a search mode selector that allows the selection of a search mode. The search mode selector's exact appearance depends on the user's environment (e.g., client software, computing device). For example, in a web browser, each search mode selector can appear as a hypertext link; user selection of a particular link selects the search mode which is associated with the selected link. Search mode selectors are included with the search results and presented. Alternatively, search mode selectors decorate or augment individual search result items when a search mode pertains to a particular search result item but not to the query in general. When a search result item is decorated by a search mode selector and presented, the search mode selector is presented with (or in close proximity to) the search result item (e.g., as a hypertext link, a button). Search mode selectors can be selected by users interacting with the user interface presented by the client. User selection of a search mode selector causes the client to notify the search engine of the selected search mode.

In some implementations, the user interface is also configured to allow the user to provide a new search query to the search engine. Receiving a new search query causes the search engine to generate new search result items and identify new search modes (return to step 310).

A particular search mode can be selected by the user (step 350).

In response to receiving search mode selection, the search engine generates new results based on the original search query (step 360). The new results contain search result items that satisfy the search query and refer to mode-specific records that pertain to the selected search mode. For example, if the 'job' search mode is selected by the user, then the new search result items refer only to job records.

Figure 4:
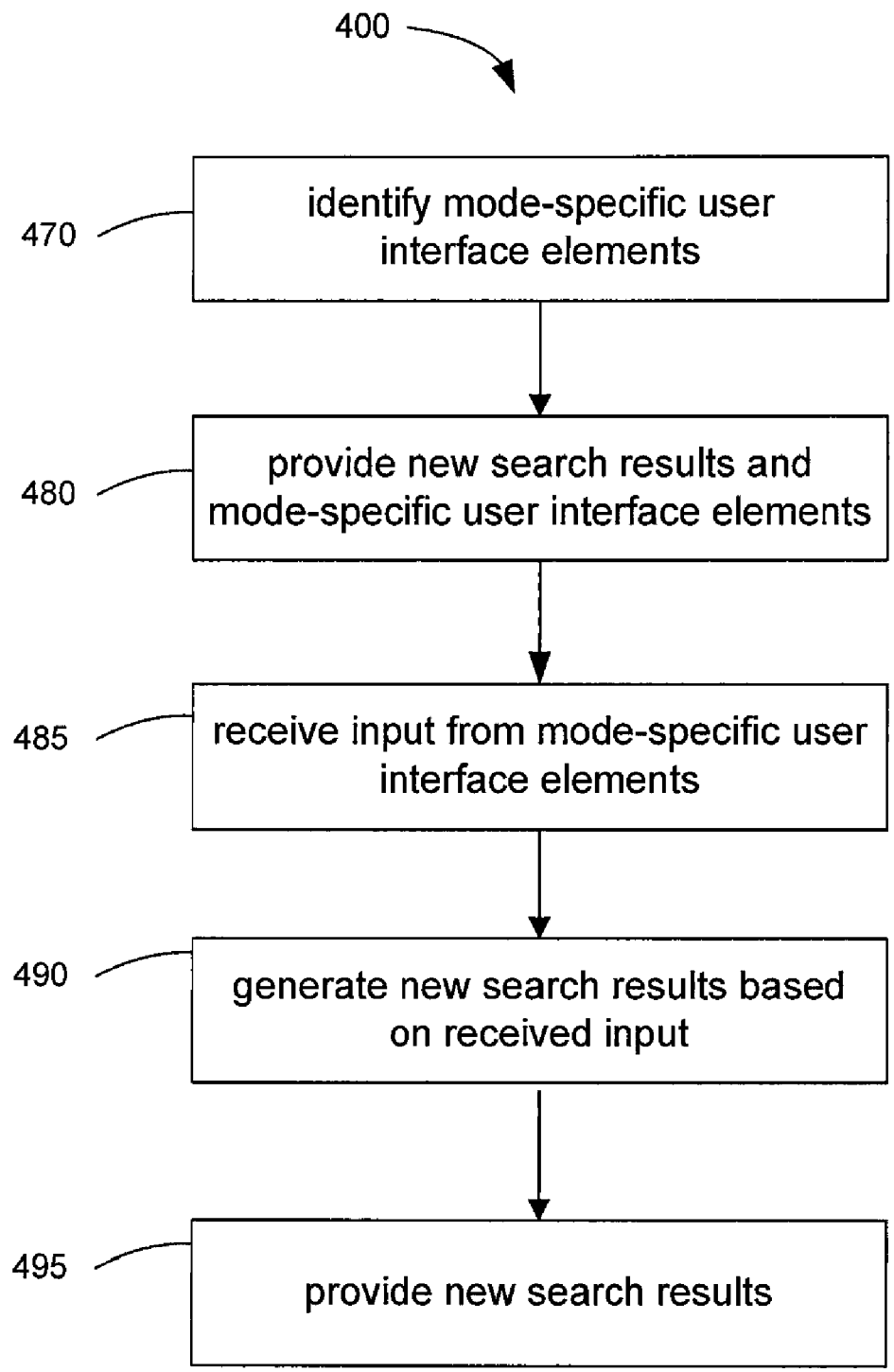
FIG. 4 is a flow diagram of a method for presenting mode-specific user interface elements.

FIG. 4 is a flow diagram of a method 400 for presenting mode-specific user interface elements. The method 400 begins after a search mode has been selected and a mode-specific search result generated. The selected search mode is used to identify mode-specific user interface elements based on associations between the search mode and the mode-specific user interface elements (step 470). Mode-specific user interface elements are identified based on predefined associations between the search modes and mode-specific user interface elements. However, a particular mode-specific user interface element can be associated with multiple search modes. For example, a mode-specific user interface element (e.g. element 640) that allows a user to view only vegetarian result items according to the "diet-type" attribute, is relevant to both the restaurant and recipe search modes, assuming that the "diet-type" attribute pertains to both modes. In another example, a mode-specific user interface element that allows users to sort results based on the distance (e.g., element 230B) to a known location can be relevant to job and restaurant search modes, but not to the recipe search mode.

The mode-specific user interface elements allow users to manipulate the presentation of mode-specific search results. In some implementations, the presentation is manipulated by receiving a revised user interface (e.g., encoded as HTML) provided by the search engine. Alternatively, the presentation can be manipulated on the user's client (e.g., according to JavaScript instructions). In some implementations, the presentations can be manipulated by a conjunction of the client and the server (e.g., an implemented in AJAX). Mode-specific user interface elements allow the presentation of search result items to be altered, for example, by displaying result items in a table (e.g., element 220A), or a list (e.g., element 220B). A list or table presents information in a structured manner that allows users to compare results relevant to the search mode (e.g., the job-mode results include salary and location). Another mode-specific user interface element can allow users to view search result items on a map, which affords precise comparison of the geographical location attribute of the search result items (e.g., restaurants in San Francisco). Some mode-specific user interface elements are allow users reorder or sort search result items according to criteria that are relevant to the search mode (e.g., salary and industry-type for the job search mode, or square-footage and price for the real-estate search mode). Other mode-specific user interface elements are operable to affect how search result items are grouped together according to mode-specific attributes of the search result items (e.g., by location, by salary-range or by diet-type).

Mode-specific user interface elements can also allow users to provide mode-specific criteria that are relevant to the selected search mode. Users can operate the mode-specific user interface elements to apply one or more mode-specific criteria to the search result items without directly manipulating the search query. Mode specific criteria generally apply a constraint to one or more attributes of the search result items. For example, a recipe search mode user interface element (e.g., element 640) allows users to select 'low-fat' as the diet-type, where diet-type is an attribute of recipe result items. Adding a mode-specific criteria affects the presentation of search result items by removing or hiding search result items that have attributes that do not satisfy the constraint. For example, in response to applying the 'low-fat' diet-type criterion, result items that do not have 'low-fat' diet-type would be hidden or removed from the presentation. Mode-specific user interface elements can allow users to specify a range of result items to include or alternatively, exclude. For example, a real-estate search mode user interface element allows users to specify a price range that constrains the results to show only those search result items that satisfy the specified price range.

Still other mode-specific user interface elements allow a user to select an alternative search mode (e.g., 610). In response to selection of an alternative search mode, new mode-specific search results are generated and provided for presentation to the user with mode-specific user interface elements that are associated to the alternative search mode. For example, although the recipe search mode is first selected in response to the "cajun" search query, subsequent input can select the restaurant search mode. In response, only restaurant mode search result items that satisfy the search query will be presented.

Both the mode-specific result items and the identified mode-specific user interface elements are presented (step 480). In some implementations, mode-specific user interface elements are presented to users on a graphical display device as user interface widgets such as buttons, links (e.g., 620) or hotspots. For example, a mode-specific user interface element can be displayed as a drop down box (e.g., 640) that contains several options to select from (e.g., to constrain the search result items or to select a search mode). Other user interface mechanisms are appropriate for other user interfaces (e.g., mobile devices, voice response systems, and computer vision systems).

In some implementations, the user interface that includes mode-specific user interface elements also allows the user to provide a new search query to the search engine. In response to receiving the new search query new search result items can be generated that include both documents and records that do not pertain to any particular search mode, and new search modes can be identified (step 310 in FIG. 3). Alternatively, receiving a new search query while a search mode is selected can cause new search result items to be generated which satisfy the new search query and refer to the selected search mode (step 360 in FIG. 3).

User input directed to a particular mode-specific user interface element is received (step 485). For example, a user can select 'Map View' 220 (FIG. 2), by clicking on the link with a mouse or by using another input device. Based on the received input, new search result items are generated based on the effect of the particular mode-specific user interface element (step 490). Alternatively, if the user chooses to sort the search result items according to an alternative mode-specific attribute (e.g., 'Post Date' 230), the result items that are ordered by the alternative mode-specific attribute are provided. If the user selects a user interface element that constrains the search result then new result items are generated that satisfy the selected constraint. For example, in reference to FIG. 6, restricting results to 'vegan' recipes 640, causes new a search result to be generated that includes only recipe search result items whose diet type is 'vegan'. The new search result items reflect the initial search query and the particular effect imparted by the user interface element (e.g., viewing, sorting, mode-specific constraints, grouping). The new results are provided to the client for presentation (step 495).

Figure 5:
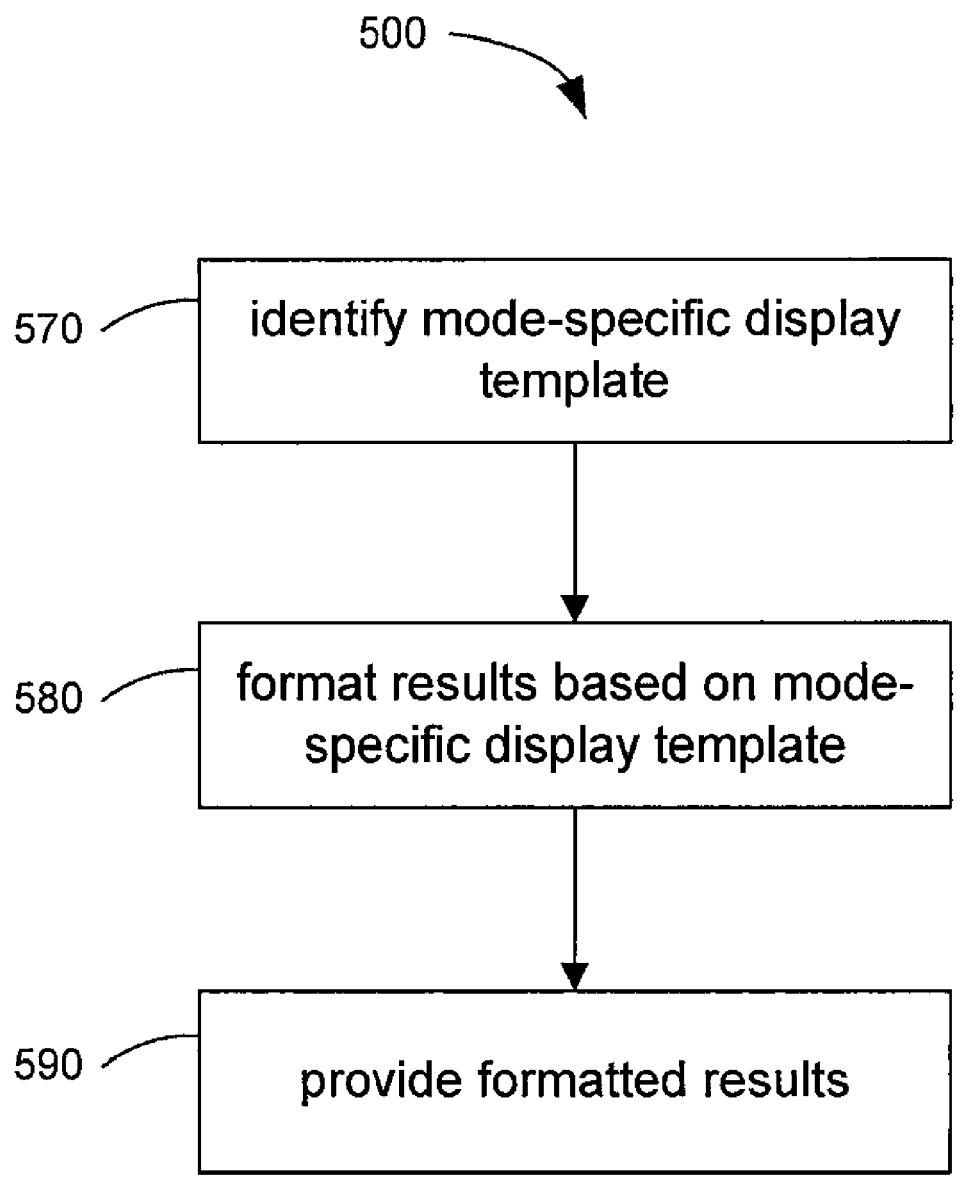
FIG. 5 is a flow diagram of a method for formatting mode-specific search result items.

FIG. 5 is a flow diagram of a method 500 for formatting mode-specific search result items. The method 500 begins after a search mode has been selected and a mode-specific search result generated. A mode-specific presentation template can be identified (step 570) based on the selected search mode. A presentation template specifies how mode-specific result items will be formatted. Formatting of the search result generally affects how the result items will be presented to the user. Presentation templates can concern every aspect of presentation including how result items are ordered and summarized, the layout of results (e.g., list, table, on a map), and whether a particular result item is presented at all. For example, the real-estate presentation template can specify that each result item (e.g., houses for sale) be shown as an icon on a geographical map where each icon on the map indicates the location of each of the presented result items. In another example, the real-estate presentation template can specify that each result item be presented in a table where each search result item is a row and each of the location, price, square-footage and a picture attributes are presented in separate columns in the respective row. The search results are formatted according to the identified presentation template (step 580) and provided for display (step 590).

Figure 6:
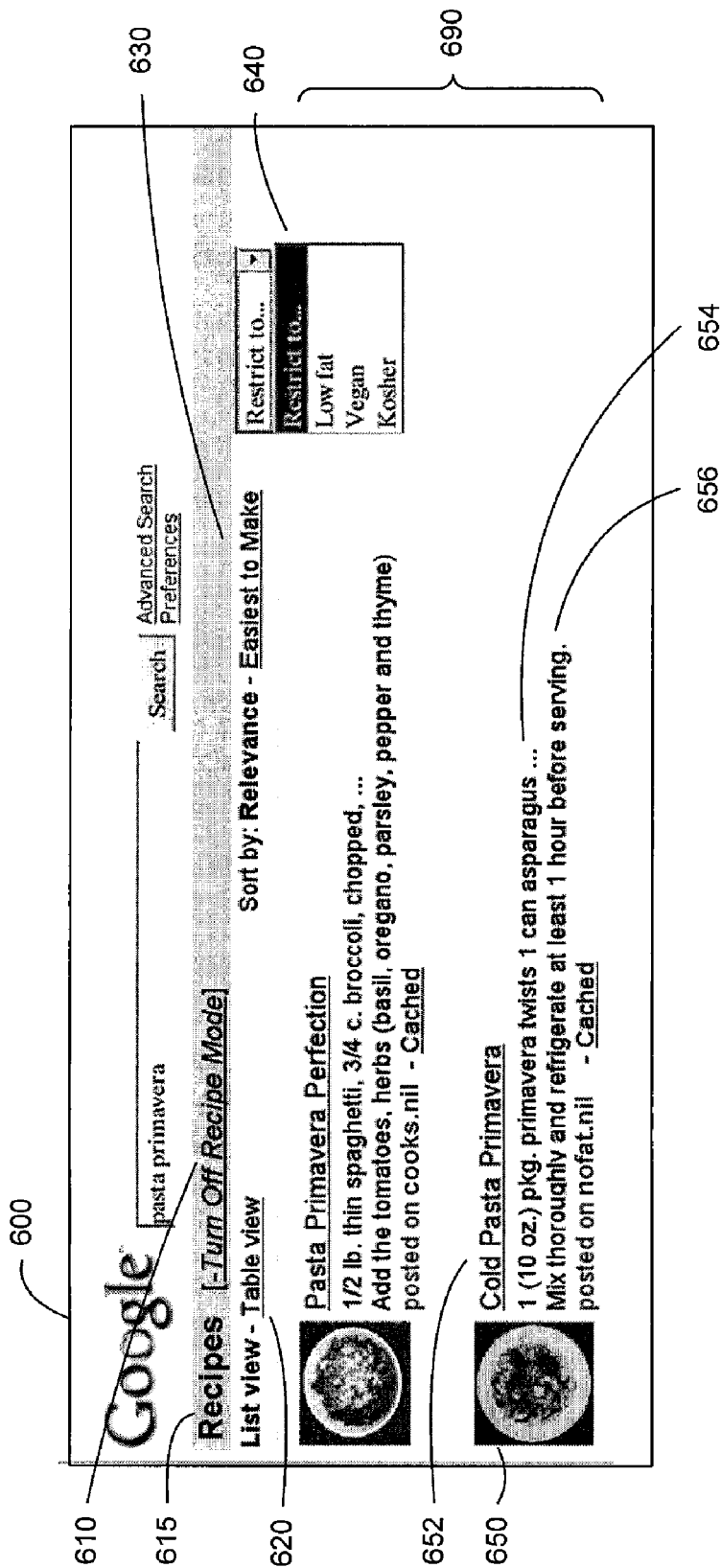
FIG. 6 illustrates an example user interface for presenting formatted mode-specific search results.

FIG. 6 illustrates an example user interface 600 presenting formatted mode-specific search results 690. In this example, 'recipe' mode has been selected 615. The recipe-mode search results 690 are presented according to the recipe-mode presentation template. The formatted search result items each include a picture of the recipe 650 and attributes of recipe search result items containing recipe-specific information including: the recipe title 652, a summary of ingredients 654 and an excerpt of the recipe directions 656. In this example, mode-specific user interface elements are also provided. The associated recipe-mode user interface elements allow the user to select an alternative search mode 610, alter the presentation of search result items 620, reorder the search result items 630 and filter the search result items 640 based on mode-specific criteria. Note that each user interface element pertains specifically to attributes related to recipe search result items (e.g., ingredients, directions, picture and diet-type).

Figure 7:
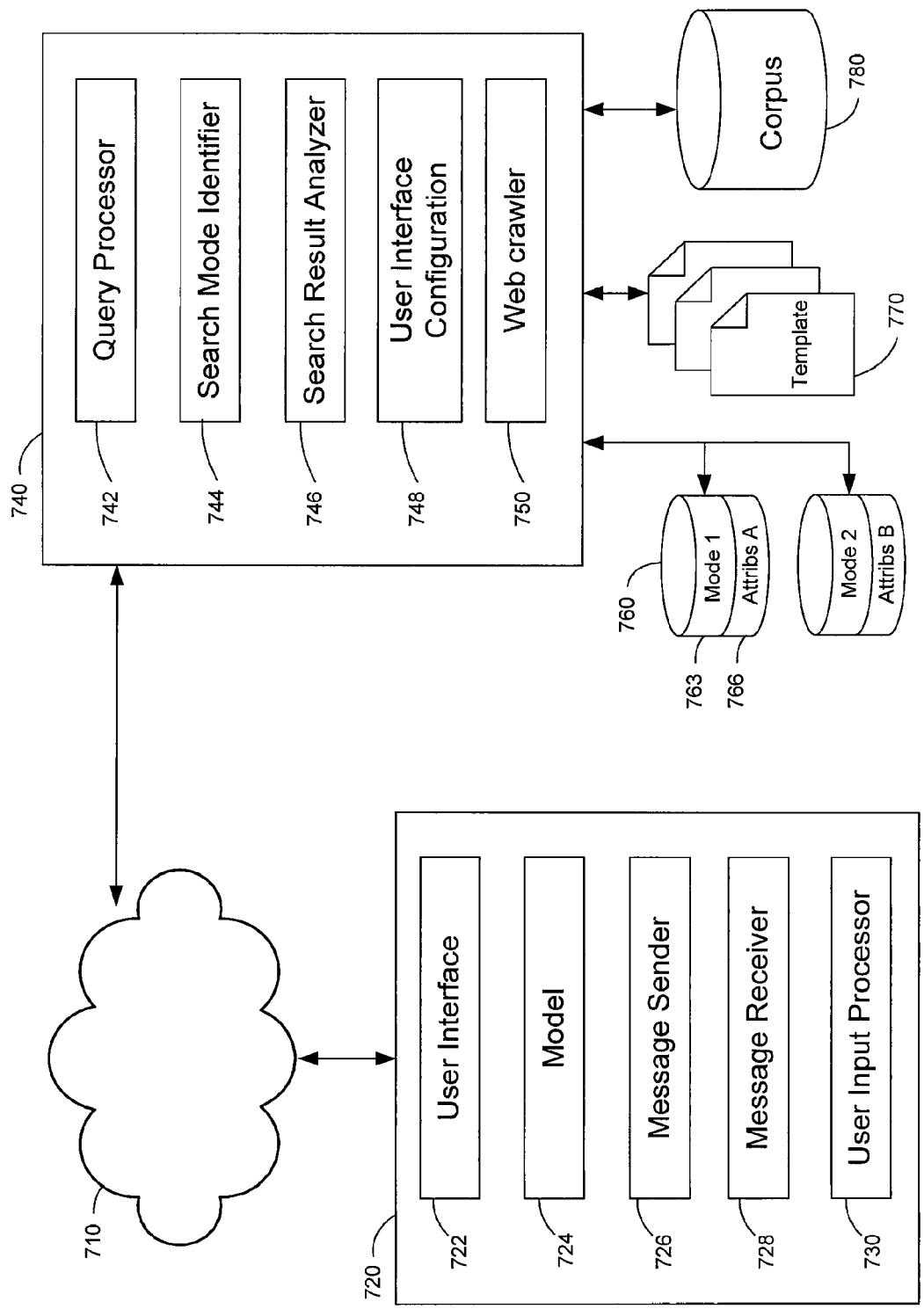
FIG. 7 is a block diagram of a client and a search engine.

FIG. 7 is a block diagram of a client and a search engine. A search engine 740 is connected to one or more networks 710 such as the Internet and can communicate with various clients 720 that are also connected to the network 710 (e.g., using a communication protocol such as HTTP). The communication flow for the client 280 and search engine 740 are bidirectional so that the search engine 740 receives information (e.g., queries or other input) from the client and can send information (e.g., results) to the client. In some implementations, the search engine 740 is Google, available from Google Inc.

The search engine 740 includes various components such as a query processor 742, search mode identifier 744, search result analyzer 746 and user interface configuration 748 module. Queries directed to the search engine are received by the query processor 742. The query processor 742 identifies one or more search result items that satisfy the search query. The query processor 742 can provide both the search query and the search result items to the search mode identifier 744. The search mode identifier 744 identifies the search modes based on information received from the query processor 742. The search result analyzer 746 can also remove and re-order search result items in response the operation of mode-specific user interface elements (e.g., sorting). The user interface configuration 748 module configures the user interface provided to users to allow selection of the search modes identified by the search mode identifier 744 and provides mode-specific user interface elements when a search mode is selected. Search result items are formatted by the user interface configuration 748 module according to the selected search mode. The search engine 740 can use the web-crawler 750 to collect documents from the network 710.

The search engine 740 can operate on resources including collections of records 760, presentation templates 770 and a corpus of documents 780. Each time a search query is received, the corpus of documents 780 is searched to retrieve search result items. The corpus can be indexed to make searching more efficient. In some implementations, the web crawler 750 populates the corpus 780 with the content of documents it has collected. The search engine 740 can also search the one or more collections of records 760 for mode-specific search result items. Each collection 760 contains records pertaining a particular search modes 763. Each mode-specific record refers to one or more mode-specific attributes 766. Each collection 760 can be located on physically separate devices, or can be contained on a single machine. In some implementations, each collection 760 is generated on the fly by processing documents in the corpus 780. The search engine 740 can also refer to particular presentation templates 770 that are predefined for each mode. In some implementations, the user interface configuration 748 module configures mode-specific search result items in the user interface according to the presentation templates 770.

The client 720 includes message receiver 728. The message receiver 728 facilitates communication with the network, and in particular, can receive encoded user interface elements and search result items (e.g. encoded in an HTML document) from the search engine 740 through the network 710. Messages are processed by the client to produce a model 724 of the user interface. The model 724 (e.g., the syntax tree of an HTML document) describes the content received by the message receiver 728. The model 724 is, in whole or in part, presented in a user interface 722 included with the client 720 (e.g., a display surface on a device, a drawing surface in a web browser application). User input is received from a user input processor 730 that can receive input from an input device (e.g., keyboard, touch screen, mouse, track pad, camera, microphone). The user input processor 730 allows for user interaction with the user interface 722. For example, input from the input processor 730 can be used to specify a search query. The search query can be encoded and provided to the search engine 740 through the network 710 by the message sender 726.

The system illustrated in FIG. 7 can contain fewer or more components than illustrated. An implementation of the search engine 740 component can be distributed, such that components of the system are separate from each other. Each component itself can be distributed across multiple physical systems. In some implementations, the client and the server are on the same physical device.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   (A) receiving a search query;
   (B) providing a first user interface, the first user interface displaying first search results specifying resources that a search engine has identified as being responsive to the search query, the first user interface further displaying a subject matter link identifying a particular subject matter that the search engine has identified based on the first search results, the particular subject matter being associated with a particular collection of records that the search engine has selected from among multiple collections of records, all records in the particular collection having a common attribute structure of data elements that pertain to the particular subject matter,
   (C) wherein the first user interface further displays a second subject matter link identifying a second subject matter that the search engine has also identified based on the first search results, the second subject matter being associated with a second collection of records that the search engine has selected from among the multiple collections of records, all records in the second collection having a common attribute structure of data elements that pertain to the second subject matter, the common attribute structure of the second collection being different than the common attribute structure of the particular collection;

(D) receiving a selection of the subject matter link;

(E) formatting second search results based on a template that is associated with the particular subject matter, each of the second search results specifying a respective record, each record being in the particular collection of records associated with the particular subject matter; and (F) providing a second user interface that displays the second search results and an interface element that is associated with the template.

2. The method of claim 1, wherein the second user interface displays the second search results in a table, wherein each row of the table refers to a single resource and each column of the table refers to a single attribute from the common attribute structure of the data elements.

3. The method of claim 1, further comprising identifying the particular subject matter based on the first search results and the search query.

4. The method of claim 1, wherein each of the second search results are responsive to the search query.

5. The method of claim 1, further comprising storing each record in the particular collection of records as structured information in one or more tables of a database management system.

6. The method of claim 1, wherein the second user interface further displays a subject matter specific user interface element that allows users to select a subject matter specific criteria, or to sort the second search results according to a subject matter specific attribute.

7. The method of claim 6, further comprising, in response to receiving a user selection of the subject matter specific user interface element, removing second search results that have attributes which do not satisfy the selected subject matter specific criteria.

8. The method of claim 6, further comprising, in response to receiving a user selection of the subject matter specific user interface element, presenting the second search results in a sorted order according to the selected subject matter specific attribute.

9. The method of claim 1, further comprising deriving records in the particular collection of records from resources on the fly.

10. A system comprising:

one or more computers; and a computer-readable medium coupled to the one or more computers having instructions stored thereon which, when executed by the one or more computers, cause the one or more computers to perform operations comprising:

(A) receiving a search query;

(B) providing a first user interface, the first user interface displaying first search results specifying resources that a search engine has identified as being responsive to the search query, the first user interface further displaying a subject matter link identifying a particular subject matter that the search engine has identified based on the first search results, the particular subject matter being associated with a particular collection of records that the search engine has selected from among multiple collections of records, all records in the particular collection having a common attribute structure of data elements that pertain to the particular subject matter, (C) wherein the first user interface further displays a second subject matter link identifying a second subject matter that the search engine has also identified based on the first search results, the second subject matter being associated with a second collection of records that the search engine has selected from among the multiple collections of records, all records in the second collection having a common attribute structure of data elements that pertain to the second subject matter, the common attribute structure of the second collection being different than the common attribute structure of the particular collection;

(D) receiving a selection of the subject matter link;

(E) formatting second search results based on a template that is associated with the particular subject matter, each of the second search results specifying a respective record, each record being in the particular collection of records associated with the particular subject matter; and (F) providing a second user interface that displays the second search results and an interface element that is associated with the template.

11. The system of claim 10, wherein the second user interface displays the second search results in a table, wherein each row of the table refers to a single resource and each column of the table refers to a single attribute from the common attribute structure of the data elements.

12. The system of claim 10, wherein the operations further comprise identifying the particular subject matter based on the first search results and the search query.

13. The system of claim 10, wherein each of the second search results are responsive to the search query.

14. The system of claim 10, wherein the operations further comprise storing each record in the particular collection of records as structured information in one or more tables of a database management system.

15. The system of claim 10, wherein the second user interface further displays a subject matter specific user interface element that allows users to select a subject matter specific criteria, or to sort the second search results according to a subject matter specific attribute.

16. The system of claim 15, wherein the operations further comprise, in response to receiving a user selection of the subject matter specific user interface element, removing second search results that have attributes which do not satisfy the selected subject matter specific criteria.

17. The system of claim 15, wherein the operations further comprise, in response to receiving a user selection of the subject matter specific user interface element, presenting the second search results in a sorted order according to the selected subject matter specific attribute.

18. The system of claim 10, wherein the operations further comprise deriving records in the particular collection of records from resources on the fly.

19. A computer storage medium encoded with a computer program, the program comprising instructions that when executed by data processing apparatus cause the data processing apparatus to perform operations comprising:

(A) receiving a search query;

(B) providing a first user interface, the first user interface displaying first search results specifying resources that a search engine has identified as being responsive to the search query, the first user interface further displaying a subject matter link identifying a particular subject matter that the search engine has identified based on the first search results, the particular subject matter being associated with a particular collection of records that the search engine has selected from among multiple collections of records, all records in the particular collection having a common attribute structure of data elements that pertain to the particular subject matter, (C) wherein the first user interface further displays a second subject matter link identifying a second subject matter that the search engine has also identified based on the first search results, the second subject matter being associated with a second collection of records that the search engine has selected from among the multiple collections of records, all records in the second collection having a common attribute structure of data elements that pertain to the second subject matter, the common attribute structure of the second collection being different than the common attribute structure of the particular collection;

(D) receiving a selection of the subject matter link;

(E) formatting second search results based on a template that is associated with the particular subject matter, each of the second search results specifying a respective record, each record being in the particular collection of records associated with the particular subject matter and (F) providing a second user interface that displays the second search results and an interface element that is associated with the template.

20. The computer storage medium of claim 19, wherein the second user interface displays the second search results in a table, wherein each row of the table refers to a single resource and each column of the table refers to a single attribute from the common attribute structure of the data elements.

21. The computer storage medium of claim 19, wherein the operations further comprise identifying the particular subject matter based on first search results and the search query.

22. The computer storage medium of claim 19, wherein each of the second search results are responsive to the search query.

23. The computer storage medium of claim 19, wherein the operations further comprise storing each record in the particular collection of records as structured information in one or more tables of a database management system.

24. The computer storage medium of claim 19, wherein the second user interface further displays a subject matter specific user interface element that allows users to select a subject matter specific criteria, or to sort the second search results according to a subject matter specific attribute.

25. The computer storage medium of claim 24, wherein the operations further comprise, in response to receiving a user selection of the subject matter specific user interface element, removing second search results that have attributes which do not satisfy the selected subject matter specific criteria.

26. The computer storage medium of claim 24, wherein the operations further comprise, in response to receiving a user selection of the subject matter specific user interface element, presenting the second search results in a sorted order according to the selected subject matter specific attribute.

27. The computer storage medium of claim 19, wherein the operations further comprise deriving records in the particular collection of records from resources on the fly.

28. The method of claim 1, wherein the particular subject matter is different than the second subject matter.

29. The method of claim 1, further comprising:
identifying, by the search engine, the resources from a corpus of resources that are responsive to the search query;
identifying the particular subject matter based on the first results; and
selecting the particular collection of records from among the multiple collection of records.

30. The method of claim 29, wherein identifying the particular subject matter based on the first search results further comprises:
identifying a keyword associated with the particular subject matter; and
determining that the keyword occurs in the resources that the search engine has identified.

31. The method of claim 29, wherein identifying the particular subject matter based on the first search results further comprises:
determining that one or more of the first search results refer to one or more records of the particular collection of records.

32. The method of claim 29, wherein identifying the particular subject matter based on the first search results further comprises:
selecting a subset of the first search results that satisfy a rank threshold,
wherein the particular subject matter is identified on the first search results of the subset.

33. The method of claim 1, wherein:
the first search results specify resources from a corpus of resources;
all records in the particular collection having a common attribute structure of data elements that each pertain to the particular subject matter; and
all resources of the corpus of resources do not share the common attribute structure.

34. The method of claim 1, wherein:
the first search results specify resources from a corpus of resources,
the corpus of resources comprises all resources that the search engine has crawled on the Internet; and
each collection of the multiple collections of records is subject-specific, and includes records associated with fewer than all of the resources of the corpus of resources.

* * * * *

UNITED STATES PATENT AND TRADEMARK OFFICE
CERTIFICATE OF CORRECTION

| | | |
|---|---|---|
| PATENT NO. | : 7,890,499 B1 | Page 1 of 1 |
| APPLICATION NO. | : 11/566083 | |
| DATED | : February 15, 2011 | |
| INVENTOR(S) | : Dustin Boswell | |

It is certified that error appears in the above-identified patent and that said Letters Patent is hereby corrected as shown below:

Column 17, line 26, in Claim 19, delete "matter" and insert -- matter; --, therefor.

Signed and Sealed this
Fifth Day of April, 2011

David J. Kappos
*Director of the United States Patent and Trademark Office*